United States Patent
Jonte et al.

(10) Patent No.: US 7,461,669 B2
(45) Date of Patent: Dec. 9, 2008

(54) SEAT KEEPER

(75) Inventors: Patrick B. Jonte, Zionsville, IN (US); Matthew Elzea, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 481 days.

(21) Appl. No.: 11/101,988

(22) Filed: Apr. 8, 2005

(65) Prior Publication Data

US 2006/0226389 A1    Oct. 12, 2006

(51) Int. Cl.
    *F16K 51/00*    (2006.01)
(52) U.S. Cl. .................. 137/454.5; 251/209; 251/310
(58) Field of Classification Search ............... 251/304, 251/310, 208, 209, 205; 137/454.5, 801
    See application file for complete search history.

(56) References Cited

U.S. PATENT DOCUMENTS

| 3,006,361 | A |   | 10/1961 | Reinemann |
|---|---|---|---|---|
| 3,645,493 | A |   | 2/1972 | Manoogian et al. |
| 3,780,758 | A |   | 12/1973 | DeVries |
| 3,807,455 | A |   | 4/1974 | Farrell |
| 3,810,602 | A |   | 5/1974 | Parkinson |
| 3,834,416 | A |   | 9/1974 | Parkison |
| 4,058,289 | A |   | 11/1977 | Hicks |
| 4,331,176 | A |   | 5/1982 | Parkison |
| 4,363,466 | A |   | 12/1982 | Bartlett |
| 4,453,567 | A |   | 6/1984 | MacDonald |
| 4,577,835 | A | * | 3/1986 | Holycross, Jr. .............. 251/310 |
| 4,651,770 | A |   | 3/1987 | Denham et al. |
| 4,678,002 | A |   | 7/1987 | Valley |
| 4,700,928 | A | * | 10/1987 | Marty ................. 137/454.6 |
| 4,738,277 | A |   | 4/1988 | Thomas |
| 4,753,418 | A |   | 6/1988 | Brotcke |
| 4,776,565 | A | * | 10/1988 | Sheen ................... 251/310 |
| 4,793,375 | A |   | 12/1988 | Marty |
| 4,823,832 | A | * | 4/1989 | Rodstein .................. 251/304 |
| 4,880,209 | A |   | 11/1989 | Bernat |
| 4,881,570 | A |   | 11/1989 | Ziebach et al. |
| 4,896,693 | A |   | 1/1990 | Rodriguez |
| 4,903,725 | A |   | 2/1990 | Ko |
| 4,915,352 | A | * | 4/1990 | Hochstrasser .............. 251/175 |
| 4,924,903 | A |   | 5/1990 | Orlandi |
| 4,932,438 | A |   | 6/1990 | Kitamura et al. |
| 4,944,330 | A |   | 7/1990 | Sakakibara et al. |
| 4,946,134 | A |   | 8/1990 | Orlandi |
| 5,044,605 | A | * | 9/1991 | Korfgen et al. ............ 251/304 |
| 5,050,633 | A |   | 9/1991 | Tarnay et al. |
| 5,088,688 | A | * | 2/1992 | Knapp ................... 251/304 |

(Continued)

FOREIGN PATENT DOCUMENTS

WO    WO 99/05437    2/1999

*Primary Examiner*—John Bastianelli
(74) *Attorney, Agent, or Firm*—Leon E. Redman

(57) ABSTRACT

A faucet valve cartridge for controlling fluid flow through a dual-handle faucet, including a valving member supported within a valve body for rotation about a longitudinal axis. A first sealing surface and a first inlet opening is supported by the valving member. A seat includes a second sealing surface and a second inlet opening. The first inlet opening is configured to be in selective fluid communication with the second inlet opening upon rotation of the valving member. A retainer couples the seat to an outer wall of the valve body.

20 Claims, 7 Drawing Sheets

U.S. PATENT DOCUMENTS

| | | |
|---|---|---|
| 5,094,258 A | 3/1992 | Orlandi |
| 5,107,884 A | 4/1992 | Orlandi |
| 5,150,737 A | 9/1992 | Clerc |
| 5,174,324 A | 12/1992 | Chrysler |
| 5,348,042 A | 9/1994 | Wagner et al. |
| RE35,545 E | 7/1997 | Chrysler |
| 5,681,028 A | 10/1997 | Cook et al. |
| 5,732,734 A * | 3/1998 | Buccicone ............. 137/625.31 |
| 5,775,373 A | 7/1998 | Pawelzik et al. |
| 5,819,789 A | 10/1998 | Schneider |
| 5,832,952 A | 11/1998 | Cook et al. |
| 5,918,626 A | 7/1999 | Strong et al. |
| 5,924,676 A | 7/1999 | Cook et al. |
| 5,971,359 A * | 10/1999 | Niakan et al. ................ 251/304 |
| 6,073,647 A | 6/2000 | Cook et al. |
| 6,202,695 B1 * | 3/2001 | Wu ........................ 137/625.31 |
| 6,279,605 B1 | 8/2001 | Wang |
| 6,382,229 B1 | 5/2002 | Baker et al. |
| 6,405,756 B2 | 6/2002 | Creswell et al. |
| 6,422,268 B1 | 7/2002 | Fleig et al. |
| 6,431,211 B1 * | 8/2002 | Wang .................... 137/625.31 |

* cited by examiner

SEAT KEEPER

BACKGROUND AND SUMMARY OF THE INVENTION

The present invention relates generally to a valve for controlling fluid flow through a faucet and, more particularly, to a valve cartridge configured to be received within a chamber of a faucet valve housing.

Faucets are generally controlled by either a single handle which utilizes a mixing valve to proportion the flow of hot and cold water to a delivery spout, or dual-handles which utilize individual valves to control the flow of hot and cold water. Dual-handle faucets typically include a pair of valve assemblies, each having a valve member rotatably seated within a valve housing and connected to a faucet handle by a valve stem extending therefrom. An aperture formed in the bottom of the valve member cooperates with an inlet port to regulate the rate and volume of fluid flow. Examples of this type of valve assembly are disclosed in U.S. Pat. Nos. 4,577,835 and 4,700,928, both of which are assigned to the assignee of the present invention and the disclosures of which are expressly incorporated by reference herein.

These prior art valve assemblies often consist of multiple components that may be readily separated from each other. Moreover, several of these individual components require independent installation into the valve housing. For example, conventional valve assemblies often include a valve member, a stop, a seat, and a spring, all of which are separate components supported by the valve housing.

According to an illustrative embodiment of the present invention, a faucet valve assembly includes a valve housing having a first bore with a longitudinal axis, and a second bore in fluid communication with the first bore, wherein the second bore is laterally offset from the longitudinal axis of the first bore. An outlet port is in fluid communication with the first bore. A valve body is positioned within the first bore of the housing. The valve body includes a cylindrical outer wall defining a receiving bore extending axially along the longitudinal axis. A valving member is supported within the receiving bore of the valve body for rotation about the longitudinal access. The valving member includes an outlet passageway configured to be in fluid communication with the outlet port of the valve housing in at least some of the rotational positions of the valving member. A valve plate is positioned within the receiving bore and is coupled to the valving member, such that the valve plate rotates with the valving member. The valve plate includes a first sealing surface and a first inlet opening laterally offset from the longitudinal axis. A seat is positioned within the second bore of the valve housing. The seat includes a second sealing surface and a second inlet opening laterally offset from the longitudinal axis. The first inlet opening is configured to be in selective fluid communication with the second inlet opening upon rotation of the valving member and the valve plate. A retainer is coupled to the seat and to the cylindrical outer wall of the valve body.

According to a further illustrative embodiment of the present invention, a faucet valve cartridge includes a valve body having an outer wall defining a receiving bore extending axially along a longitudinal axis. A valving member is supported within the receiving bore of the valve body for rotation about the longitudinal axis of the receiving bore. A valve plate is positioned within the receiving bore and is coupled to the valving member, such that the valve plate rotates with the valving member. The valve plate includes a first sealing surface and a first inlet opening offset from the longitudinal axis of the receiving bore. A seat includes a second sealing surface and a second inlet opening, the first inlet opening configured to be in selective fluid communication with the second inlet opening upon rotation of the valving member and the valve plate. A retainer extends intermediate to the outer wall of the valve body and the seat. The retainer is configured to couple the seat to the outer wall while providing for limited axial movement of the seat relative to the cylindrical wall. A biasing member is operably coupled to the seat and is configured to bias the first sealing surface into sealing engagement with the second sealing surface.

According to yet another illustrative embodiment of the present invention, a faucet valve cartridge includes a valve body having an outer wall defining a receiving bore extending axially along a longitudinal axis. A valving member is supported within the receiving bore of the valve body for rotation along the longitudinal axis of the receiving bore. A first sealing surface and a first inlet opening are supported by the valving member. A seat includes a second sealing surface and a second inlet opening, wherein the first inlet opening is configured to be in selective fluid communication with the second inlet opening upon rotation of the valving member. The seat extends downwardly below the outer wall of the valve body. A retainer couples the seat to the outer wall. A biasing member is operably coupled to the seat and is configured to bias the first sealing surface into sealing engagement with the second sealing surface. The biasing member extends downwardly below the seat and the outer wall of the valve body.

According to a further illustrative embodiment of the present invention, a faucet valve cartridge includes a valve body having a cylindrical outer wall with an inner surface. A valving member is supported for rotation within the valve body. A seat includes a body having an outer surface. A retainer includes a first pair of arcuate arms having inwardly facing portions configured to couple to the outer surface of the seat, and a second pair of arcuate arms having outwardly facing portions configured to couple to the inner surface of the outer wall.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
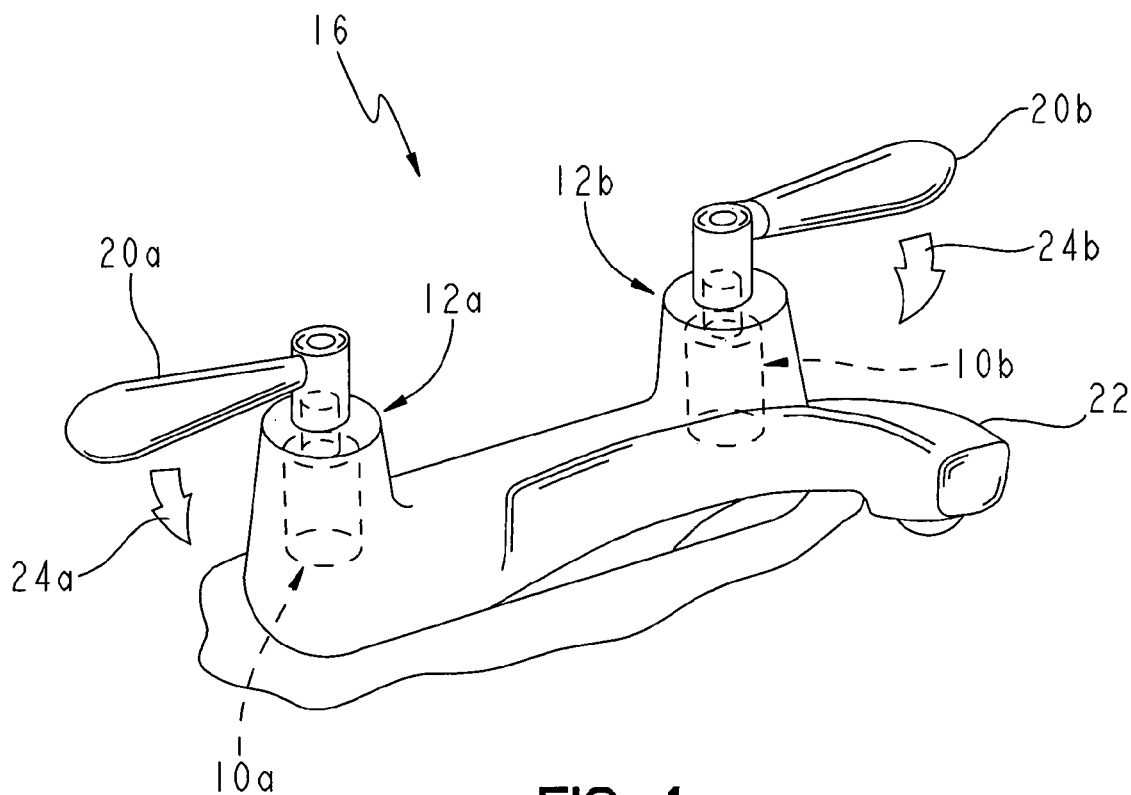
FIG. 1 is a is a perspective view of a lever-operated faucet, with movement of the operating levers shown toward open positions.
Figure 2:
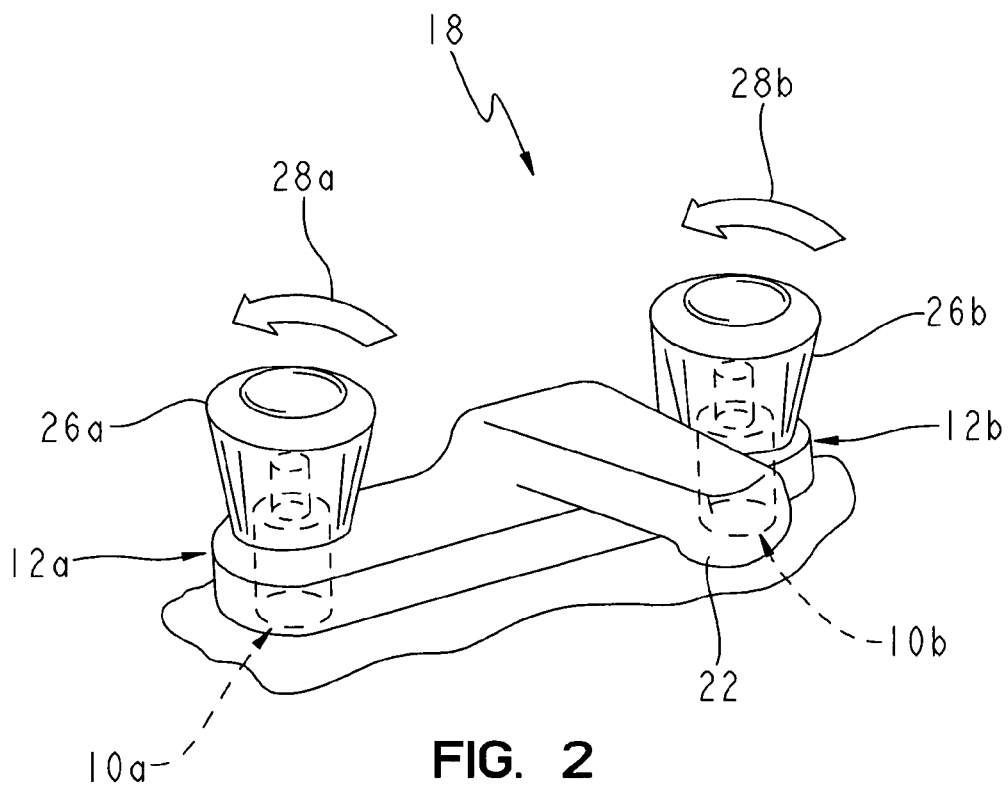
FIG. 2 is a perspective view of a knob-operated faucet, with movement of the operating knobs shown toward open positions.
Figure 3:
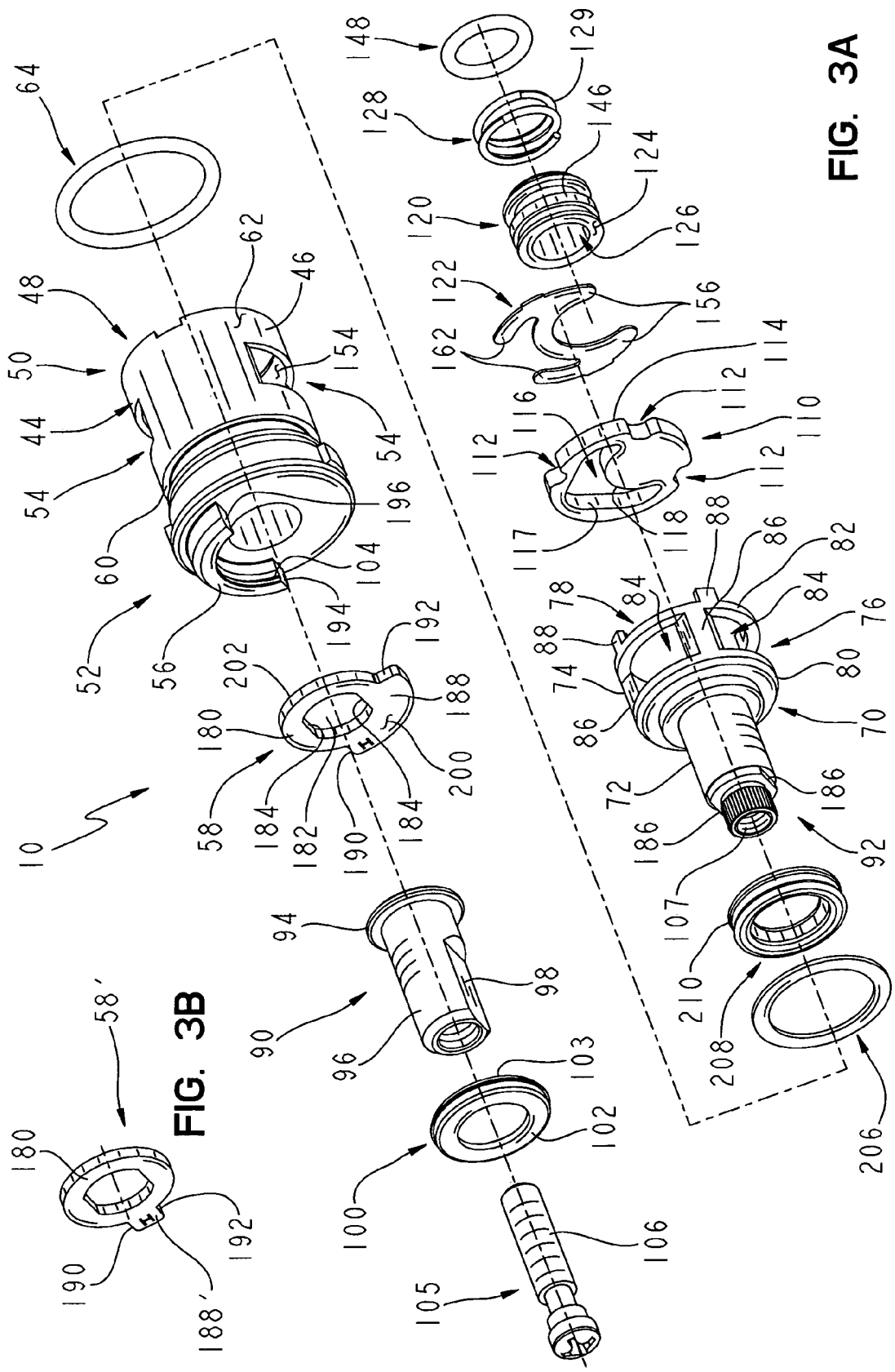
FIG. 3A is an exploded perspective view of an illustrative embodiment valve cartridge of the present invention, showing a 90-degree stop member for use in controlling hot water with the lever-operated faucet of FIG. 1.
FIG. 3B is a perspective view of an alternative embodiment 180-degree stop member for use with the knob-operated faucet of FIG. 2.

Referring initially to FIGS. 1 and 2, the illustrative embodiment faucet valve cartridge 10a, 10b of the present invention may be utilized in connection with the hot water valve assembly 12a and the cold water valve assembly 12b, respectively, of a dual-handle faucet, such as a lever-operated faucet 16 (FIG. 1) and a knob-operated faucet 18 (FIG. 2). The lever-operated faucet 16 includes a pair of rotatable handles, illustratively levers 20a, 20b which are illustratively configured to rotate approximately 90 degrees from the position of FIG. 1 in the direction of the delivery spout 22 to an open or "on" position. Moreover, fluid flow is initiated by rotating the levers 20 inwardly in the direction of arrows 24. The knob-operated faucet 18 includes a pair of rotatable handles, illustratively knobs 26a, 26b which are each rotated in a clockwise direction up to approximately 180 degrees in the direction of arrows 28 to an open or "on" position for providing fluid flow. It should be appreciated that the levers 20 and the knobs 26, along with any other conventional operating handle or actuator used in connection with a dual-handle faucet, may be utilized in connection with the valve cartridge 10 of the present invention.

Referring now to FIGS. 3A-6, each valve assembly 12 of illustrative embodiment faucets 16, 18 includes a generally cylindrical valve housing 30 having a lower externally threaded portion 32 (FIGS. 5 and 6) adapted to be connected in a conventional manner to a supply of pressurized hot or cold water (not shown). The pressurized water flows upwardly through a cylindrical central bore 34 in the threaded portion 32 of the valve housing 30. The valve housing 30 also includes a cylindrical first bore 36 and a cylindrical second bore 38 smaller than the first bore 36. The first bore 36 extends axially along a longitudinal axis 39. The second bore 38 extends axially along a longitudinal axis 40 which is laterally offset from the longitudinal axis 39 of the first bore 36. The second bore 38 connects the central bore 34 to the first bore 36 to form an inlet passage for the valve housing 30. An outlet port 41 is formed in the sidewall of the valve housing 30 and is open to the first bore 36. During operation of the faucet valve cartridge 10, as described in detail herein, water selectively flows upwardly through the central bore 34 and the second bore 38, and then out through the outlet port 41.

Figure 5:
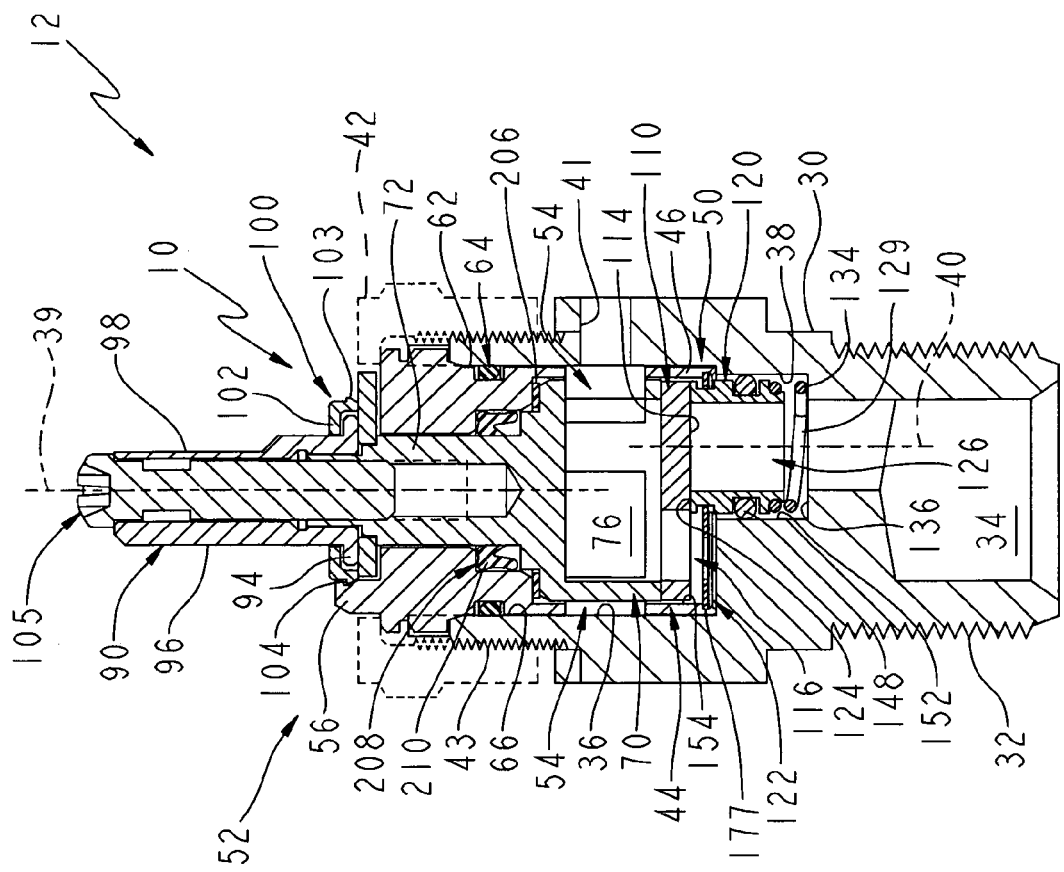
FIG. 5 is a cross-sectional view taken along line 5-5 of FIG. 4, showing the valve member and the valve plate in a closed position.
Figure 6:
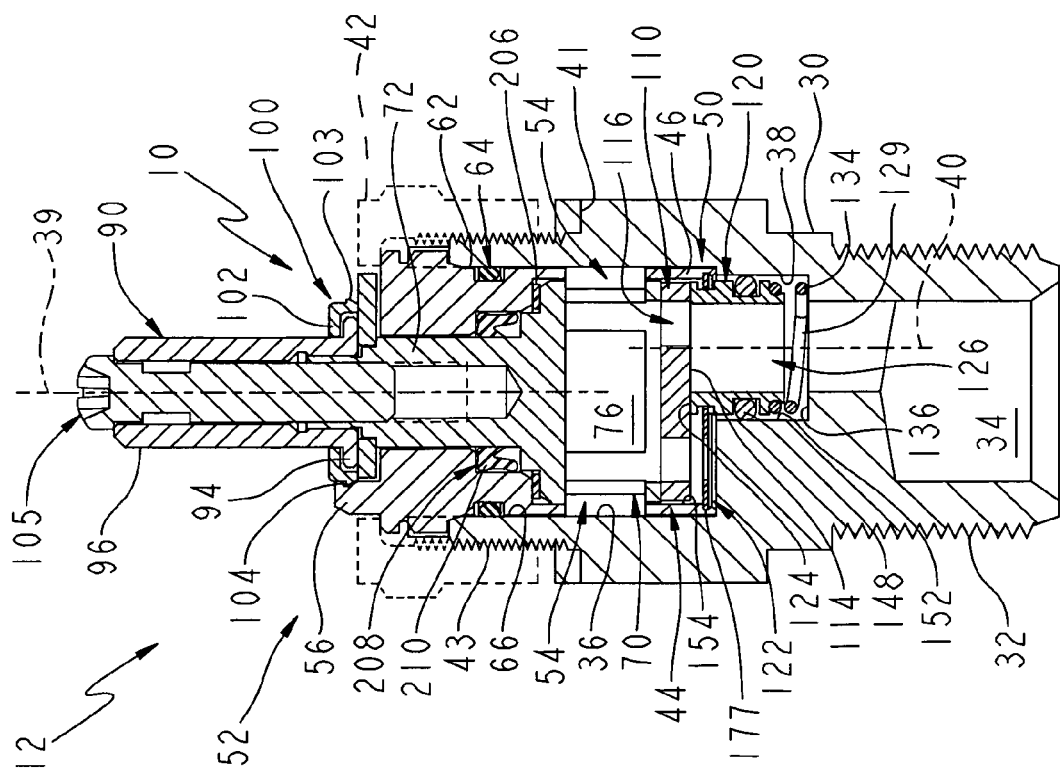
FIG. 6 is a cross-sectional view similar to FIG. 5, showing the valve member and the valve plate in an open position.

The valve cartridge 10 is disposed within the valve housing 30 and is secured therein by a collar or bonnet nut 42 which threadably engages an upper externally threaded portion 43 (FIGS. 5 and 6). The valve cartridge 10 includes a valve body 44 positioned within the first bore 36 of the valve housing 30.

The valve body 44 includes a cylindrical outer wall 46 defining a receiving bore 48 extending axially along the longitudinal axis 39. The valve body 44 extends from a lower end 50 to an upper end 52 and includes a pair of diametrically-opposed outlet ports 54 formed in the outer wall 46. Illustratively, the valve body 44 is formed of a metal, such as brass. However, other suitable materials, such as thermoplastics, may be substituted therefor.

An engagement member 56 extends upwardly from the upper end 52 of the valve body 44 and, as described in detail herein, cooperates with a stop member 58 in order to limit rotational movement of the handles 20, 26. An annular groove 60 is formed within an outer surface 62 of the outer wall 46 and is configured to receive a sealing member 64, illustratively a conventional "O" ring. The sealing member 64 provides a seal between the outer surface 62 of the valve body 44 and an inner surface 66 of the valve housing 30 at the upper end 52 of the valve body 44.

A valving member 70 is rotatably received within the receiving bore 48 of the valve body 44 and is configured to rotate about the longitudinal axis 39. The valving member 70 includes a valve stem 72 extending upwardly from a flow control member 74. The flow control member 74 includes a fluid flow passageway 76 which provides fluid communication between an open bottom 78 of the valving member 70 and at least one of the outlet ports 54 of the outer wall 46 of the valve body 44, as shown in FIGS. 5 and 6. The flow control member 74 includes an upper support 80 longitudinally spaced above an annular lower ring 82. With reference to FIG. 3A, a plurality of openings 84 are positioned intermediate spacers 86 and are in fluid communication with the passageway 76. A plurality of attachment pegs 88 extend downwardly from the lower ring 82 and are utilized to couple a valve plate 110 to the valving member 70.

While in the illustrative embodiment, the stem 72 and the flow control member 74 are integrally formed from metal, such as brass, it should appreciated that the valve stem 72 and the flow control member 74 may be separate components formed of different suitable materials. For example, the valve stem 72 may be formed of brass for strength, while the flow control member 74 formed of molded thermoplastic for manufacturing efficiency.

A stem adapter 90 is received over an upper end 92 of the valve stem 72 to facilitate coupling with a handle, such as lever 20 or knob 26. The stem adapter 90 includes a base 94 and an upwardly extending cylindrical sleeve 96. The base 94 is configured to be supported above the stop member 58, while the sleeve 96 includes a flat 98 configured to couple with a mating portion (not shown) of the handle 20, 26 to prevent relative rotation therebetween. While the stem adapter 90 is illustratively formed of a metal, such as brass, other suitable materials may be substituted therefor.

A stem holder 100 is concentrically received around the stem adapter 90 and is configured to retain the stem adapter 90 in position relative to the valve body 44. More particularly, the stem holder 100 includes an annular body 102 having a retaining lip 103 configured to be received within a cooperating arcuate groove 104 formed within the engagement member 56 of the valve body 44. Illustratively, the stem holder is formed of a polymer, such as polybutylene terephtalate (PBT). The handle 20, 26 is passed over the stem adapter 90 and is axially secured in place by a conventional fastener 105. The fastener 105 includes an externally threaded portion 106 which cooperates with internal threads 107 formed within the valve stem 72 of the valving number 70.

Referring further to FIGS. 3A, 5, and 6, in the illustrative embodiment of the present invention, the valve plate 110 includes a plurality of notches 112 positioned along its periphery and configured to receive corresponding attachment pegs 88 of the valving member 70. As such, the valve plate 110 forms a bottom plate for the valving member 70 and a fluid flow passageway which rotates together with the valving member 70. However, the valve plate 110 may be detached from the flow control member 74 for replacement or repair. The valve plate 110 includes a first sealing surface 114 and a first inlet opening 116 which is in fluid communication with the fluid flow passageway 76 when the valve plate 110 is attached to the valving member 70. Since the valve plate 110 rotates with the valving member 70, the first inlet opening 116 remains in registry or alignment with the fluid passageway 76 through all the rotational positions thereof.

In the illustrative embodiment of FIG. 3A, the first the inlet opening 116 is substantially crescent-shaped and includes substantially a concave edge 117 and a substantially convex edge 118 with common end points. Illustratively, the valve plate 110 may be formed of stainless steel designed to withstand wear and damage caused by fluid flow and any particulates which may be found within the fluid. In one illustrative embodiment, the valve plate 110 is stamped from a stainless steel blank with the first inlet opening 116 and notches 112 punched therein.

Figure 7A:
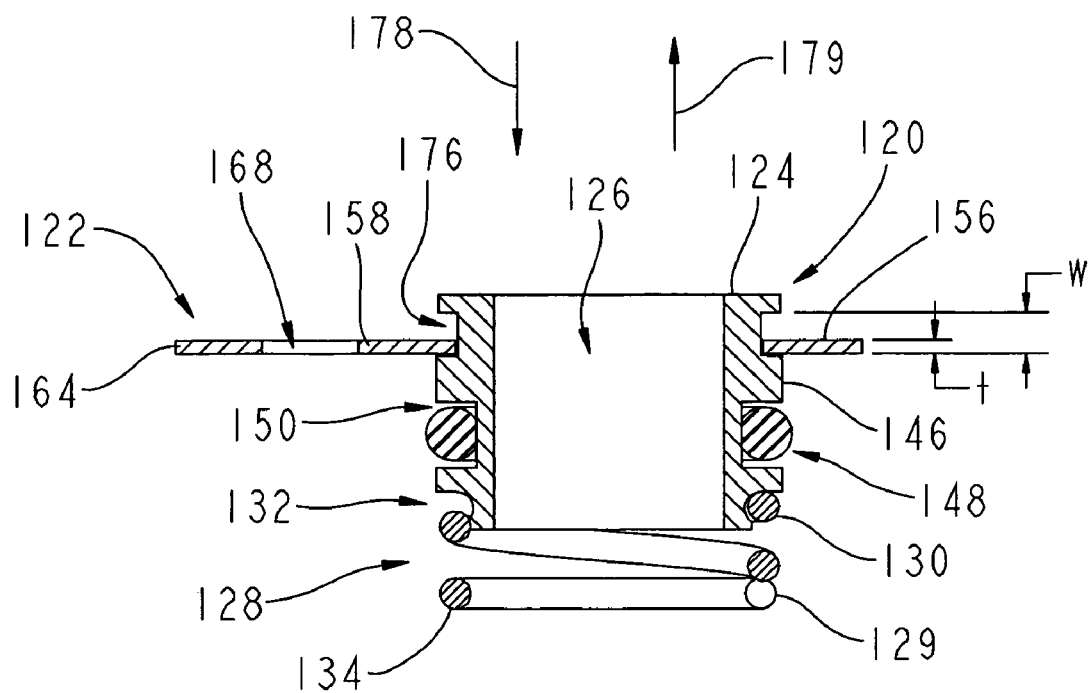
FIG. 7A is a detailed view of the illustrative embodiment seat and spring of FIG. 3A.

In order to ensure shut-off of fluid flow through the valve cartridge 10 and to prevent leakage, a valve seat 120 is positioned within the second bore 38 of the valve housing 30. A retainer 122 couples the seat 120 to the outer wall 46 of the valve body 44. The seat 120 includes an annular second sealing surface 124 and a second inlet opening 126. With the valving member 70 disposed within the valve body 44, and with the seat 120 coupled to the valve body 44, the first sealing surface 114 is configured to sealingly engage the second sealing surface 124. More particularly, a biasing member 128 biases the seat 120 upwardly against the valve plate 110. In the illustrative embodiment, the biasing member 128 comprises a compression spring 129 which is slightly compressed during use and therefore urged toward the valve plate 110. As shown in FIG. 7A, the spring 129 illustratively includes the first end 130 retained by an annular groove 132 formed in a lower end of the outer surface of the seat 120. The second end 134 of the spring 129 engages an annular surface 136 within the second bore 38 of the valve housing 30 (FIGS. 5-6).

Figure 7B:
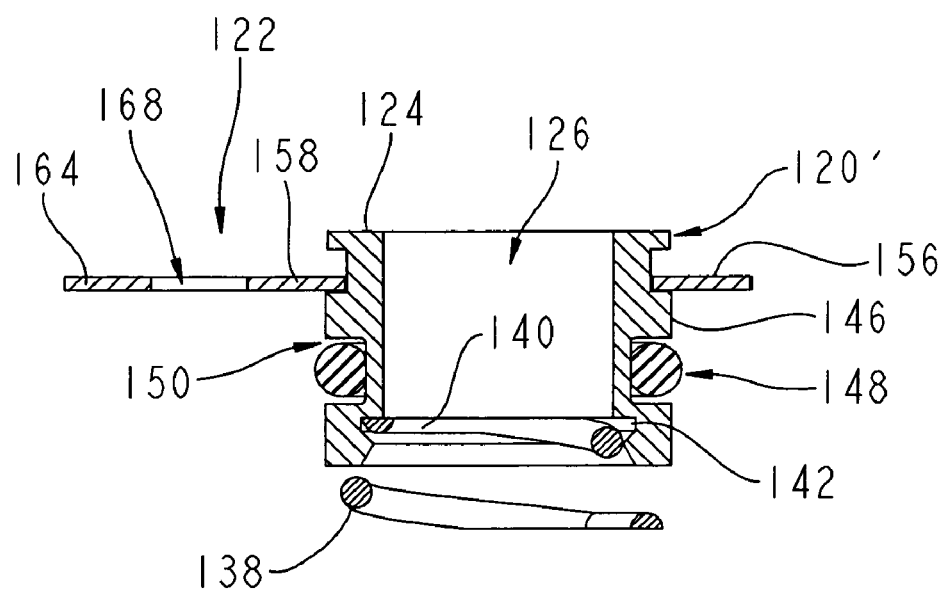
FIG. 7B is a detailed view of an alternative embodiment seat and spring.

In an alternative embodiment as illustrated in FIG. 7B, a conical coil spring 138 is received within the second inlet opening 126 defined by the seat 120'. Illustratively, the first end 140 of the spring 138 is retained by an annular groove 142 formed within the inner surface of the seat 120. The second end (not shown) of the spring 138 engages the annular surface 136 of the valve housing 30 as detailed above with respect to the spring 129.

In both illustrative embodiments of the seat 120, 120', a sealing member 148 is coupled to an outer surface 146 thereof. More particularly, the sealing member 148 illustratively comprises an O-ring received within an annular receiving groove 150. As may be appreciated, the sealing member 148 provides a seal between the inner surface 152 of the second bore 38 and the outer surface 146 of the seat 120. As described above, the seat 120 forms an annular second sealing surface 124 and a second inlet opening 126 which cooperates with the valve plate 110 to control the flow of water into the fluid passageway 76. Thus, when the first inlet opening 116 is aligned with the second inlet opening 126, water can flow from the supply through the fluid passageway 76 and out of the outlet port 41 to the faucet delivery spout 20.

As noted above, the seat 120 is coupled to the valve body 44 by a retainer 122. The retainer 122 extends intermediate the inner surface 154 of the outer wall 46 of the valve body 44 and the outer surface 146 of the seat 120. With reference to FIGS. 3A and 7A-9, the retainer 122 includes a first pair of arcuate arms 156 including inwardly facing portions or retaining lips 158 defining a semi-circular ring configured to couple to the outer surface 146 of the seat 120. The first pair of arms 156 illustratively also include outwardly facing portions or retaining lips 160 which are configured to coupled the inner surface 154 of the outer wall 46 of the valve body 44. The retainer 122 further includes a second pair of arcuate arms 162 which include outwardly facing portions or retaining lips 164 configured to couple to the inner surface 154 of the outer wall 46. Inwardly facing portions 166 of the second pair of arcuate arms 162 define an opening 168, which in certain illustrative embodiments may define a further outlet port in communication with the fluid passageway 76 of the valving member 70. As such, the valve cartridge 10 may provide fluid flow laterally through any of the outlet ports 41 or longitudinally through the outlet port defined by opening 168.

Figure 8:
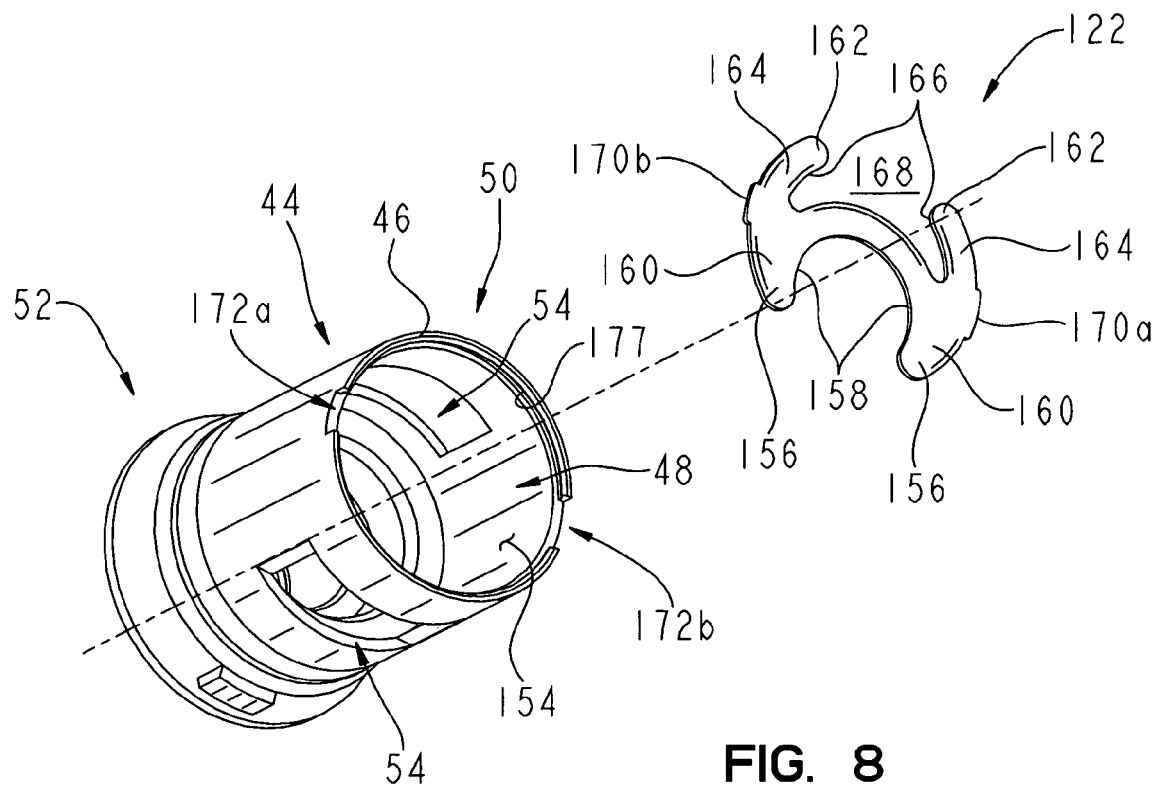
FIG. 8 is an exploded perspective view of an illustrative embodiment valve body and retainer.
Figure 9:
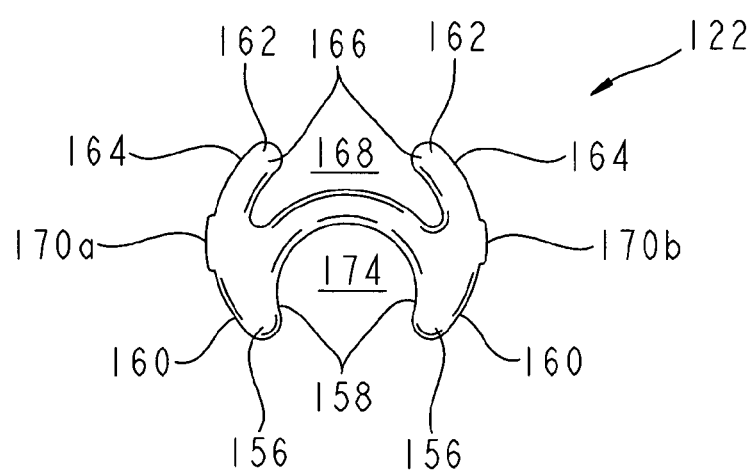
FIG. 9 is a top plan view of an illustrative embodiment retainer.

With reference to FIGS. 8 and 9, a pair of locating tabs 170 extend outwardly from the retainer 122 and are illustratively disposed intermediate the first and second pairs of arms 156 and 162. The locating tabs 170 are configured to be received within cooperating notches 172 formed within the outer wall 46 of body 44 proximate the lower end 50 thereof. As may be appreciated, positioning of the tabs 170 within the notches 172 facilitates proper angular orientation of the retainer 122, and hence the seat 120, relative to the valve body 44. In one illustrative embodiment, a first locating tab 170a and cooperating notch 172a may be larger than a second locating tab 170b and cooperating notch 172b to help ensure proper positioning of the retainer 122.

The first pair of arcuate arms 156 define an opening 174 configured to receive the seat 120. More particularly, the inwardly facing portions 158 of the first pair of arcuate arms 156 are received within an annular groove 176 formed within the outer surface 146 of the seat 120. As shown in FIG. 7A, the longitudinal width "w" of the groove 176 is greater than the longitudinal thickness "t" of the retainer 122. As such, the retainer 122 restrains the seat 120 from substantial lateral movement, while providing for limited axial movement of the seat 120 in the direction of the longitudinal axis 39, as shown by arrows 178 and 179. This limited axial movement or play of the seat 120 facilitates movement of the second sealing surface 124 upwardly into engagement with the first sealing surface 114 of the valve plate 110.

The outwardly facing portions 160 and 164 of the arcuate arms 156 and 162 are illustratively configured to be received within an annular groove 177 formed within the inner surface 154 of the outer wall 46. Illustratively, the retainer 122 may be formed of stainless steel designed to withstand wear and damage caused by fluid flow and any particulates which may be found within the fluid. In one illustrative embodiment, the arcuate arms 156 and 162 of the retainer 122 are stamped from a stainless steel blank.

As described above, a stop member 58 is operably coupled to the valve stem 72 for rotation therewith. Further, the stop member 58 is configured to cooperate with the engagement member 56 of the valve body 44 in order to limit rotation of the operating handle 22, 26. The stop member 58 illustratively includes a plate 180 having an opening 182 for receiving the valve stem 72. A pair of flats 184 are formed within the opening 182 and are configured to cooperate with corresponding flats 186 formed on the valve stem 72. An arcuate stop arm 188 extends around a portion of the periphery of the stop member 58 and includes opposing stop surfaces 190 and 192. The stop surfaces 190 and 192 are configured to contact engagement surfaces 194 and 196 supported at opposing ends of the engagement member 56 of the valve body 44 to limit angular rotation of the valve stem 72.

Figure 4:
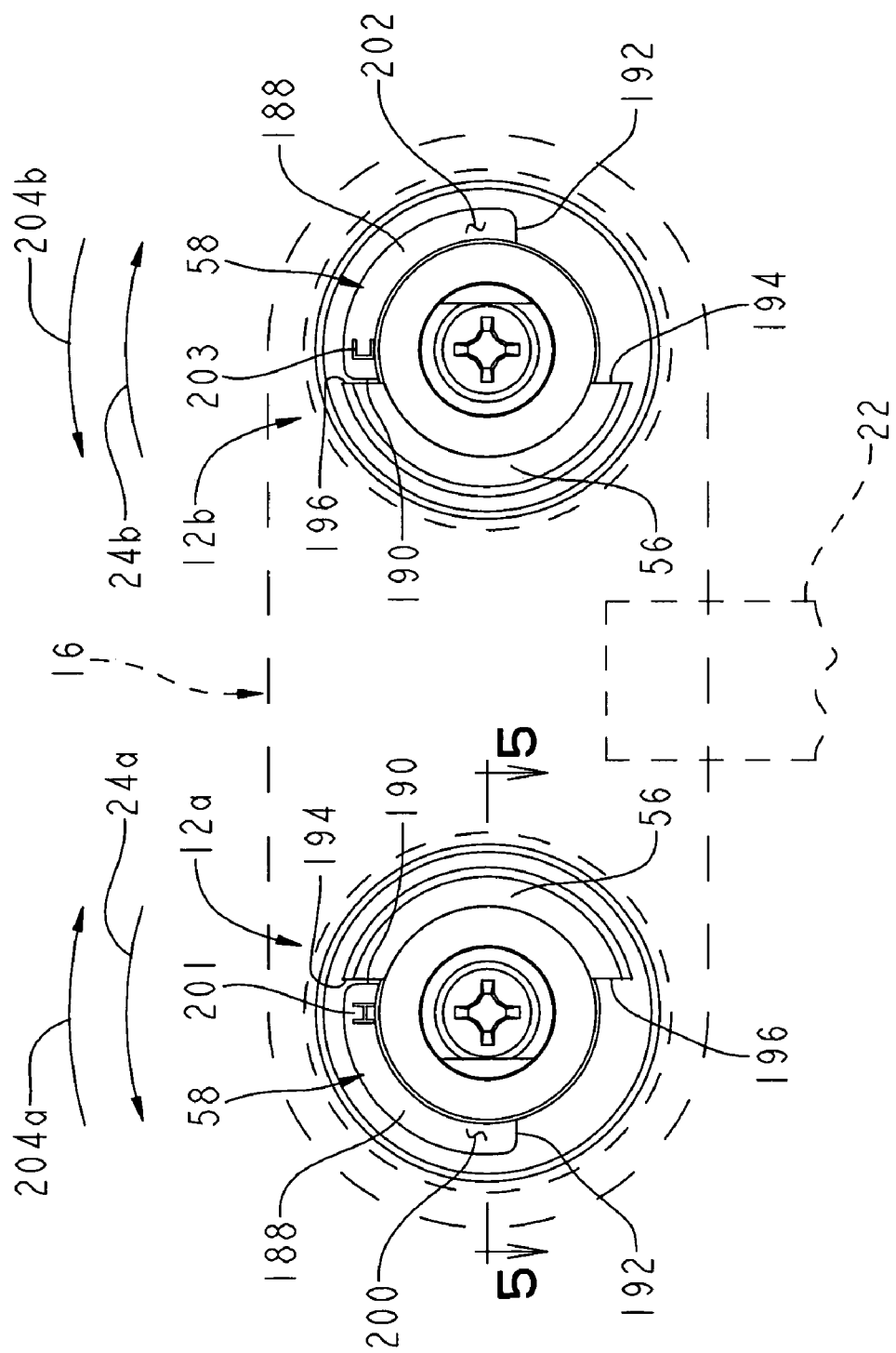
FIG. 4 is a partial top plan view of the lever-operated faucet of FIG. 1, with the lever handles removed for clarity, and including the valve cartridges of FIG. 3A configured to control the flow of hot water and cold water.

FIGS. 3A and 4 illustrate stop member 58 which is configured for use in connection with the lever-operated faucet 16 of FIG. 1. Moreover, the stop member 58 is configured to permit rotation of levers 20 in the direction of arrows 24 toward the delivery spout 22 by an angle of approximately 90 degrees. The same stop member 58 is used for both the hot water valve assembly 12a and the cold water valve assembly 12b.

The stop member 58 is configured to be reversibly mounted within the valve body 44 according to the requirements for fluid flow through the cartridge 10. A first position for use with the hot water valve assembly 12a of the lever-operating faucet 16 is shown in FIGS. 3A and 4, where a first or hot water surface 200 illustratively faces upwardly away from the valve body 44, while a second or cold water surface 202 faces downwardly toward the valve body 44. Also as shown in FIG. 4, for the cold water valve assembly 12b of the lever-operated faucet 16, the position of the stop member 58 relative to the valve body 44 is reversed so that the cold water surface 202 faces upwardly, while the hot water surface 200 faces downwardly. This changes the relative orientation of the stop arm 188 and stop surfaces 190 and 192, thereby accounting for the 180-degree rotation of the valve cartridge 106 about the longitudinal axis 39 so that the seat 120 is received within the second bore 38 of the housing 30. The hot water surface 200 is illustratively identified by a first indicia 201, such as the letter "H," and the cold water surface 202 is illustratively identified by a second indicia 203, such as the letter "C."

With further reference to FIG. 4, both the hot water valve assembly 12a and the cold water valve assembly 12b of the lever-operated faucet 16 are shown in closed or "off" positions. Additional movement of the stop surface 190 of the hot water valve assembly 12a is prevented in a clockwise direction (arrow 204a) by engagement with the engagement surface 194. Similarly, additional movement of the stop surface 190 of the cold water valve assembly 12b is prevented in the counter-clockwise direction (arrow 204b) by engagement with the engagement surface 196. As the valve stem 72 of the hot water valve assembly 12a is moved in a counter-clockwise direction (arrow 24a), its movement is stopped at approximately 90 degrees by engagement between the stop surface 192 and the engagement surface 196. Likewise, as the valve stem 72 of the cold water valve assembly 12b is moved in a clockwise direction (arrow 24b), its movement is stopped at approximately 90 degrees by engagement between the stop surface 192 and the engagement surface 194.

Figure 10:
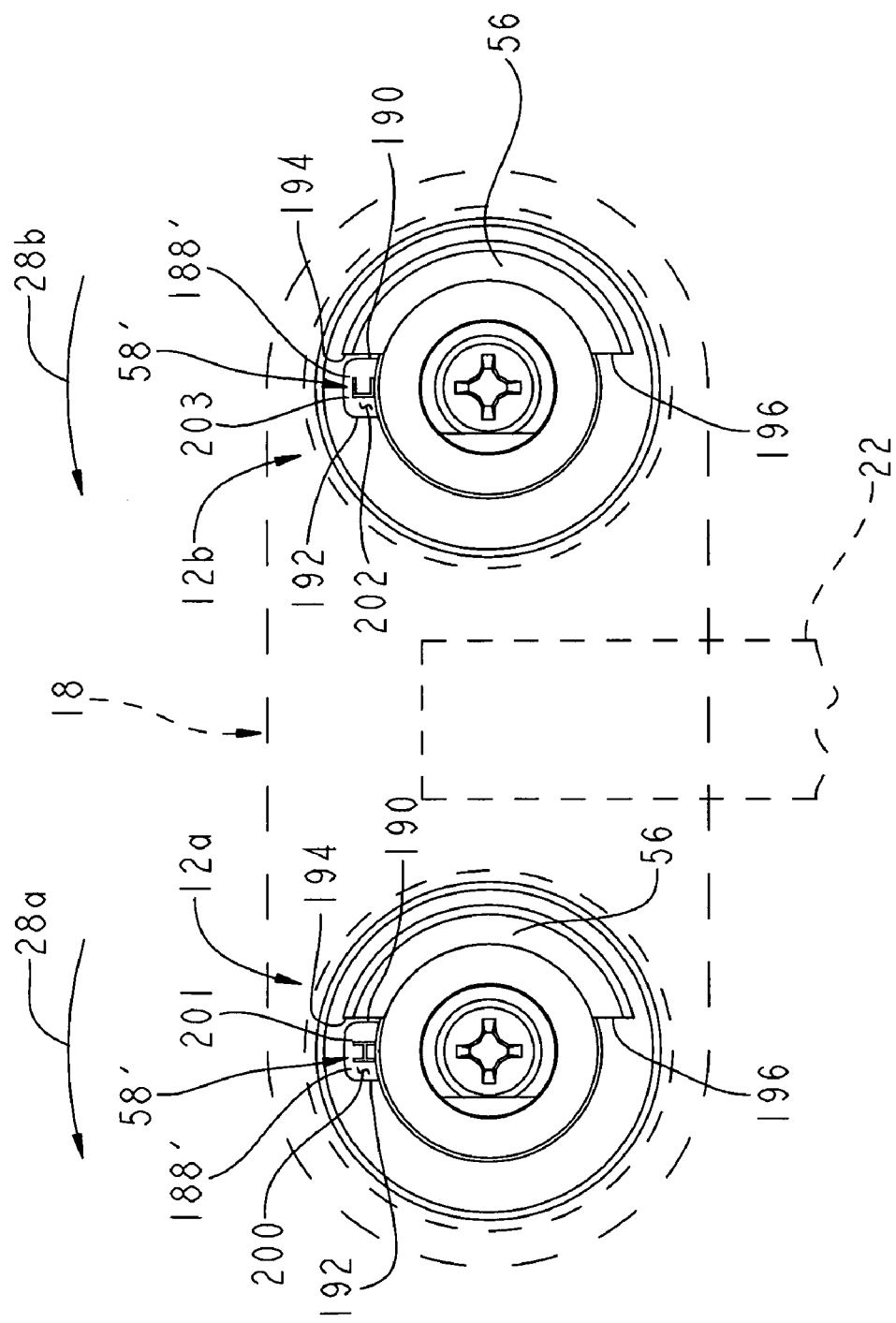
FIG. 10 is a partial top plan view of the knob-operated faucet of FIG. 2 with the knobs removed for clarity, including the valve cartridges of FIG. 3A with the 180-degree stop members of FIG. 3B, and configured to control the flow of hot water and cold water.

Not only is the valve cartridge 10 of the present invention configured to be easily converted between hot and cold water operation by reversing the position of the stop member 58, but the different stop members 58 may be substituted for each other in order to provide for different angular rotations of the respective valve stems 72. With reference to FIGS. 2, 3B and 10, an alternative embodiment stop member 58' is illustrated for use in connection with the knob-operated faucet 18, where typically an approximate 180 degree rotation is desired. The stop member 58' as illustrated provides for such angular positioning. More particularly, the stop arm 188 does not extend angularly around the periphery of the stop member 58' to the extent of the stop arm 188. As such, the stop surfaces 190 and 192 are angularly positioned closer to each other which, in turn, provides for greater rotation of the stop member 58' and valve stem 72 before alternatively engaging the engagement surfaces 194 and 196. Additional details regarding operational differences between the lever-operated faucet 16 and the knob-operated faucet 18 are provided below.

With further reference now to FIGS. 3A, 5, and 6, a washer 206 is typically disposed intermediate the valving member 70 and the valve body 44. A sealing member, illustratively a quad lip seal 208, is positioned intermediate the valving member 70 and the inner surface 152 of the valve body 44 in order to facilitate sealing therebetween. More particularly, the quad lip seal 208 facilitates sealing in response to increased water pressure. As water pressure engages an angular lip 210 of quad lip seal 208, increased sealing is provided with the inner surface 152 of the valve body 44. An illustrative quad lip seal 208 is formed of a resilient material, such as an elastomer, and is available from Minnesota Rubber of Plymouth, Minn.

As noted above, operation of the valve cartridge 10 permits usage in both hot and cold water valve assemblies 12a and 12b of either a lever-operated faucet 16 (FIG. 1), wherein the valving members 70 are rotated in opposite directions, or a knob-operated faucet 18 (FIG. 2), where the valving members 70 are rotated in the same direction. In both cases, the levers 20 or knobs 26 are attached to a respective valve stem 72 such that upon rotation, the valving member 70 will be rotated subject only to the limits of the stop member 58. In conjunction with the rotation of the valving member 70 within the valve body 44, the valve plate 110 will also be rotated, thereby selectively bringing the first inlet opening 116 into registration or communication with the second inlet opening 126 of the seat 120. Since water is provided under pressure from the supply, when the inlet openings 116 and 126 of the valve plate 110 and the seat 120 come into partial registry, fluid flow will be initiated from the flow passageway 76, and through at least one of the outlet ports 54, 168, and then out of the outlet passage of the faucet delivery spout 22. The volume of flow will be determined by the size of the opening formed between the inlet openings 116 and 126.

With reference to FIGS. 1, 2, 4, and 10, although operation of the valve cartridge 10 is similar for both lever-operated and knob-operated faucets 16 and 18, the rotational positions over which fluid flow will occur differ according to the positioning of the valve plate 110. More particularly, the valve plate 110 is oriented 180 degrees about the longitudinal axis 39 relative to the valve body 44 from the position shown in FIG. 3A for use within the cold water valve assembly 12b of the knob-operated faucet 18. Likewise, the seat 120 and the retainer 122 are oriented 180 degrees relative to the valve body 44 from the position shown in FIG. 3A for use within the cold water valve assembly 12b of the knob-operated faucet 18, such that the inlet openings 116 and 120 are configured to be selectively aligned, or placed in fluid communication. In other words, the positions of the valve plate 110 and the seat 120, as shown in FIG. 3A, may be used in the hot water valve assembly 12a to control the hot water for either type of faucet 16 and 18, since rotation is identical, as shown by arrows 24a and 28a in FIGS. 1 and 2, respectively. Similarly, the same relative orientation of the valve body 44 to the valve plate 110 and the seat 120 is used in the cold water valve assembly 12b of the lever-operated faucet 16. More particularly, in the cold water valve assembly 12b of the lever-operated faucet 16, the entire valve cartridge 10b is rotated 180 degrees about the longitudinal axis 39 so that the seat 120 is received within the second bore 38 of the valve housing 30 (FIG. 4). As detailed above, the stop member 58 is then reversed to accommodate rotation of the handles 20a and 20b in opposite directions.

With the valve plate 110 and the seat 120 in a 180 degree offset position relative to the valve body 44, the valve cartridge 10 may be utilized in the cold water valve assembly 12b to control the cold water for the knob-operated faucet 18. In other words, the valve plates 110 in the cold water valve assemblies 12b of the lever-operated faucet 16 and the knob-operated faucet 18 rotate in opposite directions, such that the valve bodies 44 and the engagement members 56 are offset 180 degrees from each other (FIGS. 4 and 10). In turn, for the seat 120 and the valve plate 110 of the cold water valve assembly 12b of the knob operated faucet 18 to be properly aligned with the fixed position of the second receiving bore 38 within the valve housing 30, the valve plate 110 is rotationally repositioned 180 degrees relative to the valve body 44.

Although the invention has been described in detail with reference to certain preferred embodiments, variations and modifications exist within the spirit and scope of the invention as described and defined in the following claims.

The invention claimed is:

1. A faucet valve assembly comprising:
a valve housing including a first bore having a longitudinal axis, a second bore in fluid communication with the first bore, the second bore being laterally offset from the longitudinal axis of the first bore, and an outlet port in fluid communication with the first bore;
a valve body positioned within the first bore of the valve housing, the valve body including a cylindrical outer wall defining a receiving bore extending axially along the longitudinal axis;
a valving member supported within the receiving bore of the valve body for rotation about the longitudinal axis, the valving member including an outlet passageway configured to be in fluid communication with the outlet port of the valve housing in at least some of the rotational positions of the valving member;
a valve plate positioned within the receiving bore and coupled to the valving member, such that the valve plate rotates with the valving member, the valve plate including a first sealing surface and a first inlet opening laterally offset from the longitudinal axis;
a seat positioned within the second bore of the valve housing, the seat including a second sealing surface and a second inlet opening laterally offset from the longitudinal axis, the first inlet opening configured to be in selective fluid communication with the second inlet opening upon rotation of the valving member and the valve plate; and
a retainer coupled to the seat and to the cylindrical outer wall of the valve body.

2. The faucet valve assembly of claim 1, further comprising a biasing member operably coupled to the seat and configured to bias the first sealing surface into sealing engagement with the second sealing surface.

3. The faucet valve assembly of claim 1, wherein the retainer provides for limited axial movement of the seat relative to the outer wall of the valve body.

4. The faucet valve assembly of claim 1, wherein the seat includes an annular groove configured to receive a retaining lip of the retainer.

5. The faucet valve assembly of claim 1, wherein the cylindrical outer wall of the valve body includes an annular groove configured to receive a portion of the retainer.

6. The faucet valve assembly of claim 1, wherein the retainer includes an opening positioned in spaced relation to the seat and configured to be in selective fluid communication with the first inlet opening of the valve plate upon rotation of the valving member and the valve plate.

7. The faucet valve assembly of claim 1, further comprising:
a valve stem extending upwardly from the valving member and configured to be coupled to a handle for rotating the valving member;
a stop member coupled to the valve stem; and
an engagement member extending upwardly from the valve body, the stop member cooperating with the engagement member for limiting rotation of the handle.

8. The faucet valve assembly of claim 7, wherein the stop member includes a plate having an opening for receiving the valve stem, the stop member further including angularly offset stop surfaces configured to contact the engagement member.

9. The faucet valve assembly of claim 1, wherein the cylindrical outer wall of the valve body includes notches, and the retainer includes locating tabs configured to be received within the notches of the cylindrical outer wall for orienting the retainer relative to the valve body.

10. A faucet valve cartridge comprising:
a valve body including an outer wall defining a receiving bore extending axially along a longitudinal axis;
a valving member supported within the receiving bore of the valve body for rotation about the longitudinal axis of the receiving bore;
a valve plate positioned within the receiving bore and coupled to the valving member, such that the valve plate rotates with the valving member, the valve plate including a first sealing surface and a first inlet opening offset from the longitudinal axis of the receiving bore;
a seat including a second sealing surface and a second inlet opening, the first inlet opening configured to be in selective fluid communication with the second inlet opening upon rotation of the valving member and the valve plate;
a retainer extending intermediate the outer wall of the valve body and the seat, the retainer configured to couple the seat to the outer wall while providing for limited axial movement of the seat relative to the cylindrical wall; and
a biasing member operably coupled to the seat and configured to bias the first sealing surface into sealing engagement with the second sealing surface.

11. The valve cartridge of claim 10, wherein the retainer includes a first portion coupled to an outer surface of the seat, and a second portion coupled to an inner surface of the outer wall.

12. The faucet valve cartridge of claim 11, wherein the seat includes an annular groove configured to receive the first portion of the retainer.

13. The faucet valve cartridge of claim 11, wherein the outer wall includes an annular groove configured to receive the second portion of the retainer.

14. The faucet valve cartridge of claim 10, wherein the outer wall of the valve body includes notches, and the retainer includes locating tabs configured to be received within the notches of the outer wall for properly orienting the retainer relative to the valve body.

15. The faucet valve cartridge of claim 10, wherein the retainer includes a first opening receiving the seat, and a second opening positioned in spaced relation to the first opening and configured to be in selective fluid communication with the first inlet opening of the valve plate upon rotation of the valving member and valve plate.

16. The faucet valve cartridge of claim 10, further comprising:
a valve stem extending upwardly from the valving member and configured to be coupled to a handle for rotating the valving member;
a stop member coupled to the valve stem; and an engagement member extending upwardly from the valve body, the stop member cooperating with the engagement member for limiting rotation of the handle.

17. A faucet valve assembly comprising:

a valve housing including a first bore having a longitudinal axis, a second bore in fluid communication with the first bore, the second bore being laterally offset from the longitudinal axis of the first bore, and an outlet port in fluid communication with the first bore;

a valve body positioned within the first bore of the valve housing, the valve body including a cylindrical outer wall defining a receiving bore extending axially along the longitudinal axis;

a valving member supported within the receiving bore of the valve body for rotation about the longitudinal axis, the valving member including an outlet passageway configured to be in fluid communication with the outlet port of the valve housing in at least some of the rotational positions of the valving member;

a valve plate positioned within the receiving bore and coupled to the valving member, such that the valve plate rotates with the valving member, the valve plate including a first sealing surface and a first inlet opening laterally offset from the longitudinal axis;

a seat positioned within the second bore of the valve housing, the seat including a second sealing surface and a second inlet opening laterally offset from the longitudinal axis, the first inlet opening configured to be in selective fluid communication with the second inlet opening upon rotation of the valving member and the valve plate;

a retainer coupled to the seat and to the cylindrical outer wall of the valve body; and a biasing member operably coupled to the seat and configured to bias the first sealing surface into sealing engagement with the second sealing surface.

18. The faucet valve assembly of claim 17, wherein the retainer provides for limited axial movement of the seat relative to the outer wall of the valve body.

19. The faucet valve assembly of claim 17, wherein the seat includes an annular groove configured to receive a retaining lip of the retainer.

20. The faucet valve assembly of claim 17, wherein the cylindrical outer wall of the valve body includes an annular groove configured to receive a portion of the retainer.

* * * * *